United States Patent
Ho

(10) Patent No.: US 9,983,636 B2
(45) Date of Patent: May 29, 2018

(54) HINGE ASSEMBLY

(71) Applicant: Hewlett-Packard Development Company, L.P., Houston, TX (US)

(72) Inventor: Chi-chung Ho, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/416,389

(22) Filed: Jan. 26, 2017

(65) Prior Publication Data

US 2017/0139447 A1    May 18, 2017

Related U.S. Application Data

(63) Continuation of application No. 14/765,328, filed as application No. PCT/CN2013/071224 on Jan. 31, 2013, now Pat. No. 9,582,048.

(51) Int. Cl.
| | |
|---|---|
| *G06F 1/16* | (2006.01) |
| *E05D 11/00* | (2006.01) |
| *F16M 11/38* | (2006.01) |
| *E05F 1/00* | (2006.01) |

(52) U.S. Cl.
CPC ........ *G06F 1/1681* (2013.01); *E05D 11/0054* (2013.01); *E05F 1/00* (2013.01); *F16M 11/38* (2013.01); *G06F 1/166* (2013.01); *G06F 1/1616* (2013.01); *E05D 2011/0072* (2013.01); *E05Y 2900/606* (2013.01); *F16M 2200/08* (2013.01)

(58) Field of Classification Search
CPC combination set(s) only.
See application file for complete search history.

(56) References Cited

U.S. PATENT DOCUMENTS

| | | | |
|---|---|---|---|
| 4,978,949 A | 12/1990 | Herron et al. | |
| 5,375,076 A | 12/1994 | Goodrich et al. | |
| 6,053,589 A | * 4/2000 | Lin | G06F 1/1616 |
| | | | 312/271 |

(Continued)

FOREIGN PATENT DOCUMENTS

| | | |
|---|---|---|
| CN | 2643451 Y | 9/2004 |
| CN | 1784133 A | 6/2006 |
| TW | 200724004 A | 6/2007 |

OTHER PUBLICATIONS

Amazon, Inc., Acer Aspire S7-391 13.3-inch Ultrabook—White (Intel Core i5 3317U 1.7GHz, 4GB RAM, 128GB SSD, LAN, WLAN, BT, Integrated Graphics, Windows 8 64-bit), 2012, 7 pgs.

(Continued)

*Primary Examiner* — Lisa Lea Edmonds
(74) *Attorney, Agent, or Firm* — HPI Patent Department

(57) ABSTRACT

The disclosure relates to a hinge assembly (70) and a tablet-notebook hybrid computer (10). The hinge assembly (70) comprises a hinge (40) for pivotably connecting a base member (20) of the tablet-notebook hybrid computer (10) to a tablet member (30) of the tablet-notebook hybrid computer (10); an actuator (51) fixed to the hinge (40); and a support member (50) pivotably connected to the tablet member (30) via a pivot shaft (52). When the tablet member (30) rotates towards an open position with respect to the base member (20), the support member (50) is actuated by the actuator (51), rotates away from the tablet member (30), and provides addition support for the tablet member (30).

14 Claims, 3 Drawing Sheets

(56) References Cited

U.S. PATENT DOCUMENTS

| | | | | |
|---|---|---|---|---|
| 6,831,229 B1* | 12/2004 | Maatta | G06F 1/1616 | 174/50 |
| 6,961,240 B2 | 11/2005 | Janicek | | |
| 7,926,781 B2* | 4/2011 | Wang | G06F 1/1616 | 248/351 |
| 7,936,559 B2 | 5/2011 | Chen | | |
| 8,031,463 B2* | 10/2011 | Yukawa | G06F 1/1615 | 313/582 |
| 8,520,382 B2* | 8/2013 | Tye | G06F 1/203 | 248/685 |
| 8,619,040 B2* | 12/2013 | Yukawa | G06F 1/1601 | 345/173 |
| 8,717,319 B2* | 5/2014 | Wu | G06F 1/1632 | 206/320 |
| 9,030,820 B2* | 5/2015 | Guo | G06F 1/1637 | 361/679.59 |
| 9,036,340 B1* | 5/2015 | Colby | G06F 1/1669 | 206/320 |
| 9,342,111 B2* | 5/2016 | Kao | G06F 1/1681 | |
| 9,348,363 B2* | 5/2016 | Hui | G06F 1/1656 | |
| 9,354,669 B2* | 5/2016 | Chen | G06F 1/1681 | |
| 9,582,048 B2* | 2/2017 | Ho | G06F 1/1616 | |
| 2002/0030969 A1* | 3/2002 | Foster | G06F 1/1616 | 361/679.1 |
| 2004/0264118 A1* | 12/2004 | Karidis | G06F 1/1616 | 361/679.55 |
| 2005/0024822 A1 | 2/2005 | Janicek | | |
| 2007/0138369 A1 | 6/2007 | Chang et al. | | |
| 2008/0304217 A1* | 12/2008 | Lai | G06F 1/1616 | 361/679.26 |
| 2009/0147469 A1* | 6/2009 | Chen | G06F 1/1616 | 361/679.55 |
| 2009/0147479 A1 | 6/2009 | Mori et al. | | |
| 2010/0127137 A1* | 5/2010 | Wang | G06F 1/1616 | 248/188.6 |
| 2010/0315773 A1* | 12/2010 | Senatori | H05K 5/0234 | 361/679.55 |
| 2011/0038119 A1* | 2/2011 | Yeh | G06F 1/1637 | 361/679.27 |
| 2011/0222238 A1* | 9/2011 | Staats | G06F 1/1632 | 361/679.55 |
| 2012/0046081 A1* | 2/2012 | Riddiford | H04M 1/022 | 455/566 |
| 2012/0162871 A1 | 6/2012 | Tseng et al. | | |
| 2013/0003284 A1* | 1/2013 | Massaro | G06F 1/166 | 361/679.28 |
| 2013/0308268 A1* | 11/2013 | Tani | G06F 1/1681 | 361/679.57 |
| 2014/0263939 A1* | 9/2014 | Rinner | F16M 11/10 | 248/688 |
| 2015/0016057 A1* | 1/2015 | Fu | G06F 1/166 | 361/679.55 |
| 2015/0055284 A1* | 2/2015 | Han | G06F 1/1616 | 361/679.12 |
| 2015/0124400 A1* | 5/2015 | Huang | G06F 1/1681 | 361/679.55 |
| 2015/0177785 A1* | 6/2015 | Liang | G06F 1/1669 | 361/679.17 |
| 2015/0185786 A1* | 7/2015 | Yeh | G06F 1/1675 | 361/679.55 |
| 2015/0192966 A1* | 7/2015 | Kim | G06F 1/1681 | 361/679.28 |
| 2015/0227168 A1* | 8/2015 | Nakamura | G06F 1/1616 | 361/679.55 |
| 2015/0293564 A1* | 10/2015 | Gu | A45C 11/00 | 361/679.55 |
| 2016/0054761 A1* | 2/2016 | Wolff | E05D 7/10 | 361/679.09 |
| 2016/0062416 A1* | 3/2016 | Hirao | G06F 1/1681 | 361/679.55 |
| 2016/0139635 A1* | 5/2016 | Gibson | G06F 1/1654 | 361/679.55 |
| 2017/0045911 A1* | 2/2017 | Ho | G06F 1/1626 | |
| 2017/0139439 A1* | 5/2017 | Okuley | G06F 1/1616 | |
| 2017/0139447 A1* | 5/2017 | Ho | G06F 1/1681 | |
| 2017/0262018 A1* | 9/2017 | Kim | G06F 1/1616 | |
| 2017/0269638 A1* | 9/2017 | Chen | E05D 7/10 | |

OTHER PUBLICATIONS

International Search Report and Written Opinion, International Application No. PCT/CN2013/071224, dated Nov. 7, 2013, 8 pages.

* cited by examiner

HINGE ASSEMBLY

CROSS-REFERENCE TO RELATED APPLICATIONS

This application is a continuation of U.S. application Ser. No. 14/765,328 filed on Jul. 31, 2015, which claims priority to and is a national stage application under 35 § USC 371 of International Application No. PCT/CN2013/071224 filed on Jan. 31, 2013, all of which are incorporated herein by reference in their entirety.

BACKGROUND

There are some laptop or notebook computers that emulate the function of a tablet computer, which are also referred to as tablet-notebook hybrid computers. These tablet-notebook hybrid computers are equipped with a touch screen display member that rotates with respect to a keyboard member with the touch screen display member facing outward for use as a tablet. In these tablet-notebook hybrid computers configurations, the essential hardware of the computer, including the processor, memory, and battery, is housed in the keyboard member (also referred to as base member) of the notebook computer. The touch screen display member (also referred to as tablet member) is hinged to the keyboard member, so that the touch screen display member can rotates with respect to the keyboard member between an open position and a closed position.

DESCRIPTION OF DRAWINGS

Examples of the present disclosure are described in the following description with reference to the figures, in the figures, identical and similar structures, elements or parts thereof are labeled with the same or similar references. Referring to the attached figures.

DESCRIPTION OF THE EMBODIMENTS

Figure 1:
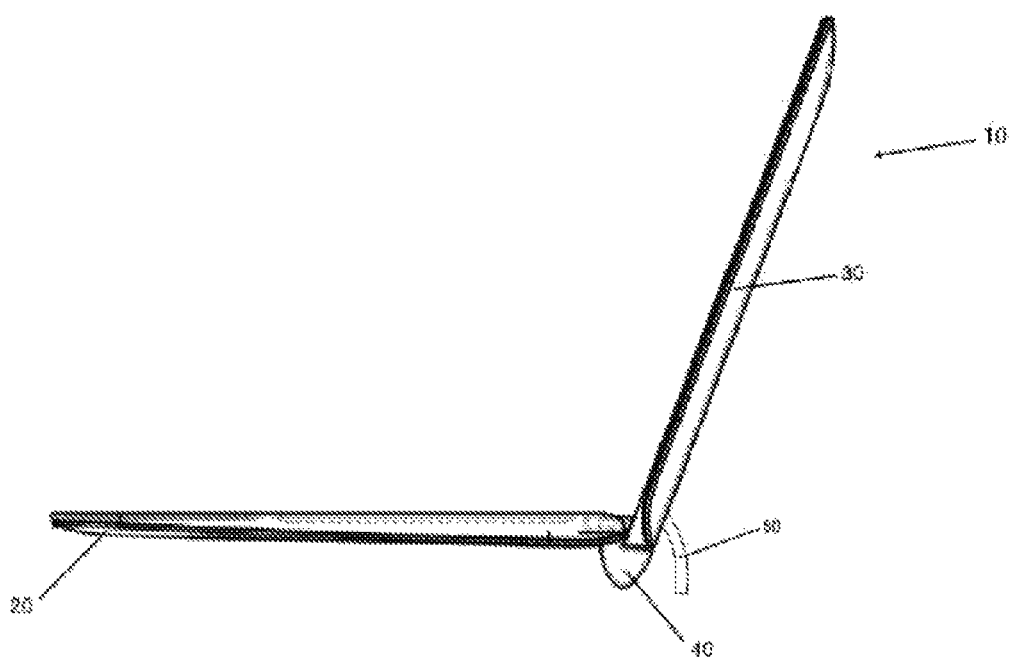
FIG. 1 is a perspective view of a tablet-notebook hybrid computer according to an example of the present disclosure, wherein a tablet member is located in an open position with respect to a base member.

As used herein, directional terms, such as "up", "down", "front", "rear", "leading", "trailing", "transverse" etc., are used with reference to the orientation of the figures being described. Because components of various examples disclosed herein can be positioned in a number of different orientations, the directional terminology is used for illustrative purposes only, and is not intended to be limiting. It is also to be understood that the examples illustrated in the drawings, and the specific language used herein to describe the same are not intended to limit the scope of the disclosure. Alterations and further modifications of the features illustrated herein, and additional applications of the principles illustrated herein are to be considered to fall within the scope of the disclosure.

In the existing tablet-notebook hybrid computers comprising a base member and a tablet member, since the tablet member is heavier than traditional LCD, the tablet member may not be very steadily held at the open position when the tablet member is at an open position with respect to the base member, if the open angle is large, for example, greater than 90 degrees, the tablet-notebook hybrid computers will be easy to tip over. In addition, for a touch application, if its tablet member (i.e., LCD member) is slightly touched or contacted by a finger of a user, the tablet-notebook hybrid computers will be unstable.

According to an example of the disclosure, a hinge assembly for a tablet-notebook hybrid computer is provided, comprising: a hinge for pivotably connecting a base member of the tablet-notebook hybrid computer to a tablet member of the tablet-notebook hybrid computer; an actuator fixed to the hinge; and a support member pivotably connected to the tablet member via a pivot shaft. When the tablet member rotates towards an open position with respect to the base member, the support member is actuated by the actuator, rotates away from the tablet member, and provides addition support for the tablet member.

Figure 2:
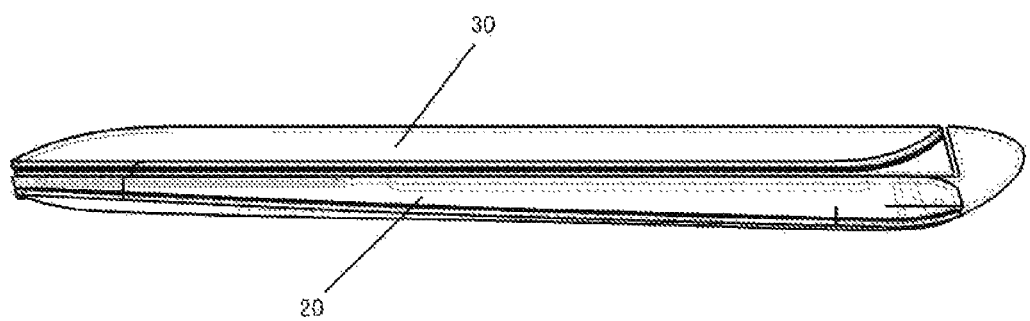
FIG. 2 is a perspective view of the tablet-notebook hybrid computer according to an example of the present disclosure, wherein the tablet member is located in a closed position with respect to the base member.

FIG. 1 is a perspective view of a tablet-notebook hybrid computer 10 according to an example of the present disclosure, wherein a tablet member 30 is located in an open position with respect to a base member 20. FIG. 2 is a perspective view of the tablet-notebook hybrid computer 10 according to an example of the present disclosure, wherein the tablet member 30 is located in a closed position with respect to the base member 20.

In an example, a tablet-notebook hybrid computer 10 includes a base member 20 and a tablet member 30. In an example, the tablet member 30 of the tablet-notebook hybrid computer 10 is hinged to the base member 20 of tablet-notebook hybrid computer 10 by one or more center hinges 40, so that the tablet member 30 can be pivoted to a closed position with respect to the base member 20 to close tablet-notebook hybrid computer 10, and can be pivoted towards an open position away from the base member 20 to open the tablet-notebook hybrid computer 10.

In an example, the tablet member 30 of the tablet-notebook hybrid computer 10 is hinged to the base member 20 of tablet-notebook hybrid computer 10 by a hinge assembly 70 (as shown in FIGS. 3-6).

Figure 3:
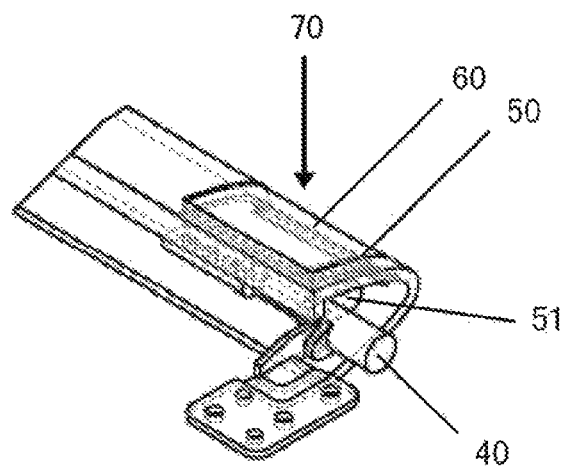
FIG. 3 is a perspective view of the hinge assembly for the tablet-notebook hybrid computer according to an example of the present disclosure, wherein the tablet member is located in the closed position with respect to the base member.
Figure 4:
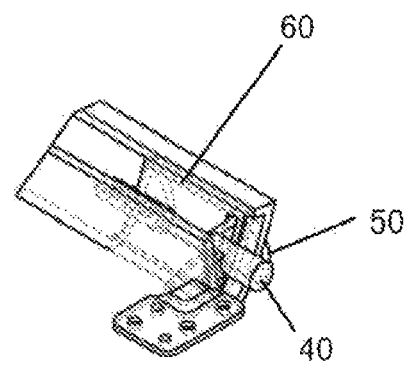
FIG. 4 is a perspective view of the hinge assembly for the tablet-notebook hybrid computer according to an example of the present disclosure, wherein the tablet member is located in the open position with respect to the base member.
Figure 5:
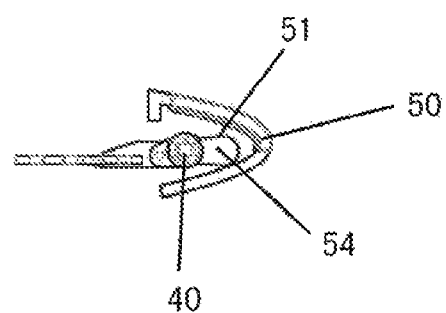
FIG. 5 is a cross-sectional view of the hinge assembly for the tablet-notebook hybrid computer according to an example of the present disclosure, wherein the tablet member is located in the closed position with respect to the base member.
Figure 6:
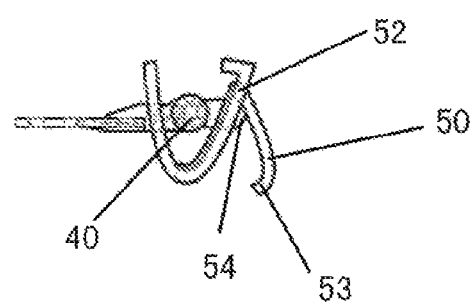
FIG. 6 is a cross-sectional view of the hinge assembly for the tablet-notebook hybrid computer according to an example of the present disclosure, wherein the tablet member is located in the open position with respect to the base member.

FIG. 3 and FIG. 4 are perspective views of the hinge assembly 70 for the tablet-notebook hybrid computer according to an example of the present disclosure. FIG. 5 and FIG. 6 are cross-sectional views of the hinge assembly 70 for the tablet-notebook hybrid computer 10 according to an example of the present disclosure. FIG. 3 and FIG. 5 show the tablet member is located in the closed position with respect to the base member. FIG. 4 and FIG. 6 show the tablet member is located in the open position with respect to the base member.

In an example, as shown in FIGS. 3-6, the hinge assembly 70 comprises a hinge 40 for pivotably connecting the base member 20 of the tablet-notebook hybrid computer 10 to the tablet member 30 of the tablet-notebook hybrid computer 10. The hinge assembly 70 further comprises an actuator 51 fixed to the hinge 40 and a support member 50 pivotably connected to the tablet member 30 via a pivot shaft 52. In an example, as shown in FIGS. 3-6, the actuator 51 is a cam. The cam includes a cam lobe 54 which contacts and actuates the support member 50 when the tablet member 30 rotates with respect to the base member 20.

When the tablet member 30 rotates towards an open position with respect to the base member 20, the support member 50 is actuated by the cam lobe 54 of the cam, rotates away from the tablet member 30, and provides addition support for the tablet member 30. Thus, the tablet-notebook hybrid computers 10 will not tip over. In addition, for a touch application, if the tablet member 30 is slightly touched or contacted by a finger of a user, the tablet-notebook hybrid computers 10 will be stable.

As shown more clearly in FIG. 6, the support member 50 has a first end pivotably connected to the tablet member 30 and a free second end, the second end of the support member 50 includes a foot 53 so as to support the tablet member 30. When the tablet member 30 rotates towards the open position with respect to the base member 20, the cam contacts with a midportion between the first end and the second end, so that the second end (and the foot 53) rotates away from the tablet member 30 and rests on the table so as to support the tablet member 30.

It should be noted that, although FIGS. 3-6 show that the cam and the support member 30 are located on the right end of the hinge 40, the cam and the support member 30 can be located at any position on the hinge 40, for example, left end of the hinge 40 and any middle position between the right end and the left end of the hinge 40. In addition, although FIGS. 3-6 show that the hinge assembly 70 includes one cam and one support member 30, the hinge assembly 70 can include two or more cams and two or more support members 30.

The hinge assembly 70 further comprises a spring 60 fit over the pivot shaft 31, for biasing the support member 50 back when the tablet member 30 rotates to the closed position with respect to the base member 20.

Having described an example of the hinge assembly for the tablet-notebook hybrid computer of the present disclosure, and in particular the hinge assembly by which the tablet member of the tablet-notebook hybrid computer can be stable and will not tip over, it should be apparent to those skilled in the art that the disclosure may be modified in both arrangement and detail.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A computer, comprising:
   a base member;
   a display member;
   an actuator; and
   a hinge fixed to the actuator for pivotably connecting the base member of the computer to the display member of the computer, the hinge comprising a cover, wherein the base member and the display member are elevated by the cover when the display member rotates on the hinge towards an open position with respect to the base member.

2. The computer of claim 1, wherein the base member and the display member rest on the cover when the display member rotates towards the open position with respect to the base member.

3. The computer of claim 1, wherein the hinge is included in a hinge assembly and the hinge assembly includes the actuator fixed to the hinge.

4. The computer of claim 1, wherein the computer is supported by the hinge and the base member when the display member rotates towards the open position with respect to the base member.

5. The computer of claim 1, wherein the base member and the display member are lowered by the hinge when the display member rotates towards a closed position with respect to the base member.

6. A hinge assembly for a computer, comprising:
   a base member connected to a first side of the hinge assembly;
   a display member connected to a second side of the hinge assembly; and
   a hinge fixed to an actuator for pivotably connecting the base member to the display member, wherein the display member comprises a foot that covers the hinge, wherein the base member and the display member are elevated by the foot when the display member is in an open position with respect to the base member.

7. The hinge assembly of claim 6, wherein the base member and the display member rest on the foot when the display member is in the open position with respect to the base member.

8. The hinge assembly of claim 6, wherein the computer is supported by the foot and the base member when the display member is in the open position with respect to the base member.

9. The hinge assembly of claim 6, wherein the base member and the display member are lowered by the foot when the display member is in a closed position with respect to the base member.

10. A computer, comprising:
    a base member;
    a display member comprising a foot that curves behind the base member; and
    a hinge assembly to stabilize the computer, the hinge assembly comprising:
       a hinge for pivotably connecting the base member of the computer to the display member of the computer, when the display member rotates towards an open position with respect to the base member, the base member and the display member are elevated by the foot; and
       an actuator fixed to the hinge.

11. The computer of claim 10, wherein the base member and the display member rest on the foot when the display member rotates towards the open position with respect to the base member.

12. The computer of claim 10, wherein the computer is supported by the hinge assembly and the base member when the display member rotates towards the open position with respect to the base member.

13. The computer of claim 10, wherein the base member and the display member are lowered by the hinge assembly when the display member rotates towards a closed position with respect to the base member.

14. The computer of claim 10, wherein the actuator is a cam.

* * * * *